US009786119B2

(12) United States Patent
Morrow et al.

(10) Patent No.: US 9,786,119 B2
(45) Date of Patent: Oct. 10, 2017

(54) TECHNIQUES OF SYNCHRONIZING COMMUNICATIONS OF GAMING DEVICES FOR SHARED GAMING ACTIVITIES

(71) Applicant: IGT CANADA SOLUTIONS ULC, Moncton (CA)

(72) Inventors: James William Morrow, Reno, NV (US); Sean Miller, Moncton (CA); Bradley Boudreau, Dieppe (CA)

(73) Assignee: IGT CANADA SOLUTIONS ULC, Moncton (CA)

( * ) Notice: Subject to any disclaimer, the term of this patent is extended or adjusted under 35 U.S.C. 154(b) by 164 days.

(21) Appl. No.: 14/572,622

(22) Filed: Dec. 16, 2014

(65) Prior Publication Data

US 2016/0171825 A1 Jun. 16, 2016

(51) Int. Cl.
*A63F 13/00* (2014.01)
*G07F 17/32* (2006.01)

(52) U.S. Cl.
CPC ...... *G07F 17/3225* (2013.01); *G07F 17/3223* (2013.01)

(58) Field of Classification Search
CPC ............. G07F 17/3204; G07F 17/3223; G07F 17/3225; G07F 17/3281
USPC ...................................................... 463/20, 42
See application file for complete search history.

(56) References Cited

U.S. PATENT DOCUMENTS

| | | | |
|---|---|---|---|
| 5,611,730 A | 3/1997 | Weiss | |
| 2002/0123376 A1 | 9/2002 | Walker et al. | |
| 2004/0009808 A1 | 1/2004 | Gauselmann | |
| 2006/0116201 A1 | 6/2006 | Gauselmann | |
| 2007/0060365 A1 | 3/2007 | Tien et al. | |
| 2008/0254897 A1 | 10/2008 | Saunders et al. | |
| 2008/0268959 A1 * | 10/2008 | Bryson | G07F 17/32 463/42 |
| 2009/0209333 A1 | 8/2009 | Kelly et al. | |
| 2011/0028203 A1 | 2/2011 | Agarwal et al. | |
| 2011/0092278 A1 | 4/2011 | Johnson | |
| 2012/0157178 A1 | 6/2012 | Lockton et al. | |

OTHER PUBLICATIONS

International Search Report and Written Opinion mailed Oct. 5, 2015 for International Application No. PCT/CA2015/050099.

* cited by examiner

*Primary Examiner* — James S McClellan
(74) *Attorney, Agent, or Firm* — Sage Patent Group

(57) ABSTRACT

A method for synchronizing a casino game playable at a plurality of gaming devices is provided. The method includes receiving, by a server having at least one processor, an indication of a wager from at least one of the plurality of gaming devices, obtaining, by the server, indications of communication latency from the server to at least a first gaming device and a second gaming device of the plurality of gaming devices, and sending, by the server, game outcome determinations to at least the first and second gaming devices, the sending including sending a first game outcome determination to the first gaming device through wired communication channels, and sending a second game outcome determination to the second gaming device through at least one wireless communication channel, wherein sending the first and second game outcome determinations is based at least in part on the indications of communication latency.

18 Claims, 11 Drawing Sheets

TECHNIQUES OF SYNCHRONIZING COMMUNICATIONS OF GAMING DEVICES FOR SHARED GAMING ACTIVITIES

BACKGROUND

Interest in electronic and computerized implementations of casino gaming machines has increased in recent years. For example, slot machines historically were mechanical devices ("steppers") with physical reels that were spun by pulling a lever on the side of the machine. Newer casino gaming machines are controlled by one or more computer processors that calculate outcomes of wagers provided to the machines. For example, a computer processor may randomly determine whether a wager is a winning or non-winning wager, and may additionally determine a value of a win. Additionally, or alternatively, a wager placed with a casino gaming machine may result in a win of a shared jackpot, such as a progressive jackpot. A progressive jackpot is one in which the value of the jackpot increases a small amount with each game that is played (e.g., played by any of a number of players). At the occurrence of a qualifying event, one of the players wins a jackpot, which may be the money present in the progressive jackpot pool or some other amount.

In some cases, a casino gaming machine determines the outcome of a wager without communication with any other device. This allows for a fast determination of the outcome since a modern processor may make a random determination of whether a win has occurred in a short time scale. These cases are sometimes referred to as "machine determined win" or "MDW" cases. However, in an MDW scenario, the machine is acting independently of other gaming machines and consequently outcomes that involve actions of multiple machines, such as whether a progressive jackpot has been won, are difficult to perform. In some cases, therefore, a casino gaming machine may determine the outcome of a wager by communicating with a server that determines the outcome. These cases are sometimes referred to as "centrally determined win" or "CDW" cases. In a CDW scenario, outcomes that involve actions of multiple machines can be performed since the server can coordinate the outcome at each of the gaming machines. However, this means that all communications with the server should occur within a short time scale, since players at a number of gaming machines are waiting for the result of their collective wagers and the outcome should be reported at each of the machines in a synchronized fashion.

SUMMARY

The present application relates generally to techniques of synchronizing devices participating in a shared gaming activity.

According to some aspects, a method for synchronizing a casino game playable at a plurality of gaming devices is provided, comprising receiving, by a server comprising at least one processor, an indication of a wager from at least one of the plurality of gaming devices, determining, by the server, a schedule for at least one jackpot of the casino game based at least in part on the received indication of the wager, and sending, by the server, the schedule for the at least one jackpot of the casino game to at least a first gaming device and a second gaming device of the plurality of gaming devices, the sending comprising sending the schedule to the first gaming device through wired communication channels, and sending the schedule to the second gaming device through at least one wireless communication channel.

According to some aspects, a server system for synchronizing a casino game playable at a plurality of gaming devices is provided, the server system comprising at least one communication interface configured to communicate with the plurality of gaming devices, at least one processor, and at least one processor-readable storage medium comprising processor-executable instructions that, when executed, cause the at least one processor to receive, via the at least one communication interface, an indication of a wager from at least one of the plurality of gaming devices, determine a schedule for at least one jackpot of the casino game based at least in part on the received indication of the wager, and send, via the at least one communication interface, the schedule for the at least one jackpot of the casino game to at least a first gaming device and a second gaming device of the plurality of gaming devices, the sending comprising sending the schedule to the first gaming device through wired communication channels, and sending the schedule to the second gaming device through at least one wireless communication channel.

According to some aspects, a method for synchronizing a casino game playable at a plurality of gaming devices is provided, comprising receiving, by a server comprising at least one processor, an indication of a wager from at least one of the plurality of gaming devices, sending, by the server, an instruction to execute a bonus game having a duration to at least a first gaming device and a second gaming device of the plurality of gaming devices, and sending, by the server within the duration of the bonus game, game outcome determinations to at least the first and second gaming devices, the sending comprising sending a first game outcome determination to the first gaming device through wired communication channels, and sending a second game outcome determination to the second gaming device through at least one wireless communication channel, wherein the game outcome determinations are based at least in part on the received indication of the wager.

According to some aspects, a server system for synchronizing a casino game playable at a plurality of gaming devices is provided, the server system comprising at least one communication interface configured to communicate with the plurality of gaming devices, at least one processor, and at least one processor-readable storage medium comprising processor-executable instructions that, when executed, cause the at least one processor to receive, via the at least one communication interface, an indication of a wager from at least one of the plurality of gaming devices, send, via the at least one communication interface, an instruction to execute a bonus game having a duration to at least a first gaming device and a second gaming device of the plurality of gaming devices, and send, via the at least one communication interface within the duration of the bonus game, game outcome determinations to at least the first and second gaming devices, the sending comprising sending a first game outcome determination to the first gaming device through wired communication channels, and sending a second game outcome determination to the second gaming device through at least one wireless communication channel, wherein the game outcome determinations are based at least in part on the received indication of the wager.

According to some aspects, a method for synchronizing communication for a casino game playable at a plurality of gaming devices is provided, comprising receiving, by a server comprising at least one processor, an indication of a wager from at least one of the plurality of gaming devices, obtaining, by the server, indications of communication latency from the server to at least a first gaming device and a second gaming device of the plurality of gaming devices, and sending, by the server, game outcome determinations to at least the first and second gaming devices, the sending comprising sending a first game outcome determination to the first gaming device through wired communication channels, and sending a second game outcome determination to the second gaming device through at least one wireless communication channel, wherein the game outcome determinations are based at least in part on the received indication of the wager, and wherein sending the first and second game outcome determinations is based at least in part on the indications of communication latency from the server to the first and second gaming devices.

According to some aspects, a server system for synchronizing a casino game playable at a plurality of gaming devices is provided, the server system comprising at least one communication interface configured to communicate with the plurality of gaming devices, at least one processor, and at least one processor-readable storage medium comprising processor-executable instructions that, when executed, cause the at least one processor to receive, via the at least one communication interface, an indication of a wager from at least one of the plurality of gaming devices, obtain indications of communication latency from the server system to at least a first gaming device and a second gaming device of the plurality of gaming devices, and send, via the at least one communication interface, game outcome determinations to at least the first and second gaming devices, the sending comprising sending a first game outcome determination to the first gaming device through wired communication channels, and sending a second game outcome determination to the second gaming device through at least one wireless communication channel, wherein the game outcome determinations are based at least in part on the received indication of the wager, and wherein sending the first and second game outcome determinations is based at least in part on the indications of communication latency from the server to the first and second gaming devices.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
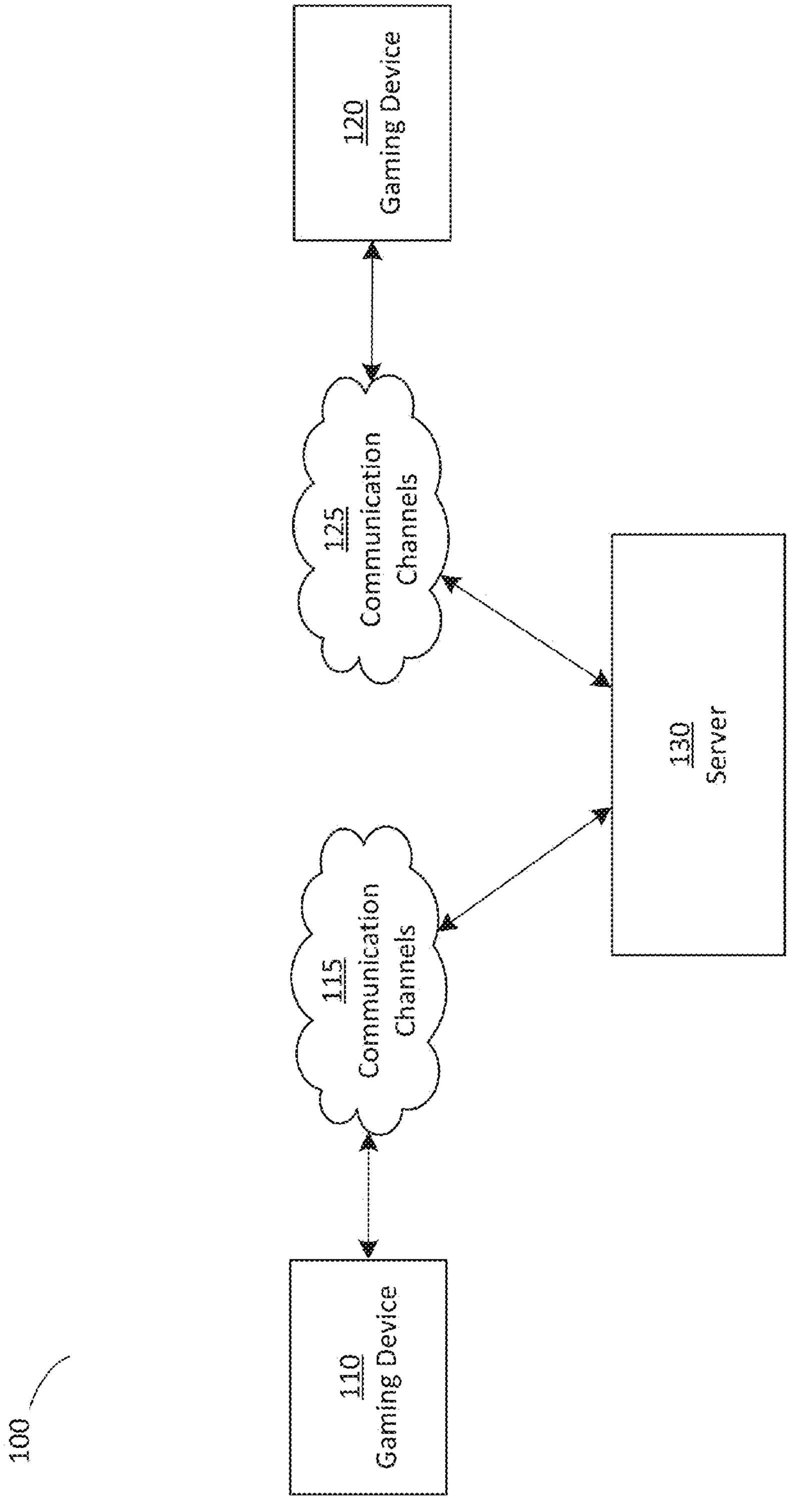
FIG. 1 depicts an illustrative system suitable for practicing techniques for synchronizing devices participating in a shared gaming activity, according to some embodiments.

An electronic gaming machine, sometimes referred to as an "EGM," which includes casino gaming machines, may engage in machine determined win (or "MDW") scenarios and/or centrally determined win (or "CDW") scenarios. Thus an EGM may quickly process wagers from a player in MDW scenarios and/or may participate in shared gaming activities, such as progressive or other jackpots, in CDW scenarios. However, participation in CDW scenarios conventionally limits the EGM to use cases in which all of the EGMs participating in the same shared gaming activity have a low latency connection to the server making an outcome determination (e.g., which participants have won a prize, how much the prize is, etc.). If the latency of this connection were higher, win conditions might be determined at the server before all the wagers are received from the EGMs, potentially leading to players missing out on winning a prize when they legitimately participated in the shared activity. Accordingly, providing an indication of an outcome of a shared gaming activity to all participants at substantially the same time is important.

The inventors have recognized and appreciated that gaming activities using non-casino devices, such as personal computers and mobile devices, have become more popular in recent years. However, such devices tend to have much higher communication latencies with remote servers than can be provided for in a casino environment (e.g., because the devices connect to a remote server via the Internet, rather than using a dedicated, high speed connection to a nearby server). Consequently, participation of non-casino devices in shared jackpot activities has generally been considered impractical, since the latencies inhibit the providing of outcomes to each of these devices at substantially the same time. While MDW activities may be performed on non-casino devices, large wins such as jackpots have particular security concerns due to their large payouts and consequently they should be identified under the supervision of a central server, and not on a personal device that isn't directly under a casino's control. For example, a device such as a personal computer could be "hacked" in a way that a casino gaming machine could not, such that the personal computer is able to spoof the winning of a prize. Thus, there may be concerns that a jackpot win may not be legitimate unless it has been determined by a coordinating server. Accordingly, non-casino devices have conventionally be excluded from shared jackpot activities.

The inventors have recognized and appreciated that, by using techniques to compensate for latency, a centrally determined win system may be produced in which gaming devices exhibiting a wide range of communication latencies with a server may participate in a shared gaming activity in a synchronized fashion. Some or all of the gaming devices may additionally provide machine determined win activities in addition to the centrally determined win activities.

Thereby, a wide range of gaming devices, such as casino gaming machines, personal computers and mobile devices, may collectively participate in shared gaming activities that involve wagering, such as progressive or other jackpots.

According to some embodiments, devices participating in a shared gaming activity are synchronized by determining a schedule for the gaming activity by the server. The schedule may indicate a future time at which a shared event, such as awarding of a jackpot, is to occur. By providing an indication of the schedule to each of the participating devices, and/or to devices having a low communication latency with participating devices, the participating devices may present the shared event at substantially the same time. Accordingly, while the indication of the schedule for the shared event may arrive at the participating devices (and/or to those devices having a low communication latency with participating devices) at different times, presentation of the shared event may be synchronized across the participating devices. In cases where a schedule is sent to a device having a low communication latency with one or more participating devices, the device may transmit to the participating devices at the scheduled time such that the participating devices are able to present the shared event at substantially the same time as any other participating devices.

According to some embodiments, a schedule may be determined that indicates to participating devices how a shared jackpot is progressing over time. Such a schedule may be based on extrapolation of any factors that lead to a determination of a shared jackpot size. For example, where each wager from a participating device increases the shared jackpot by a particular amount, an estimate of the shared jackpot at times in the future may be determined by extrapolating from the current jackpot size based on the number of participating devices. In some cases, the indication of how the shared jackpot is progressing over time may not be completely accurate, as by the time the indication has been received by participating devices, additional devices may have begun to participate and/or previously participating devices may have stopped participating. However, in many cases the rate of change of a shared jackpot may be sufficiently small that any lack of accuracy will not be apparent to a player when an indication of the shared jackpot is presented.

According to some embodiments, a schedule may indicate predetermined times at which a shared event is permitted to occur, and which are synchronized across the participating devices. In some cases, the predetermined times are regularly-spaced "ticks," and a shared event, such as a jackpot win, may occur at any one of these times, but may not occur at any other times. By quantizing the times at which shared events are permitted to occur, a central server may be provided with a greater window of time in which to indicate the shared event to participating devices (e.g., indicating to each device that a jackpot was won, and indicating whether that device was a winner). Since each participating device is provided with the same schedule of predetermined times at which the shared events may occur, and since the devices are synchronized with respect to this schedule, the central server is provided with the window of time between adjacent predetermined times to deliver the indication of the shared event to all participating devices.

According to some embodiments, devices participating in a shared gaming activity are synchronized by selecting a time to transmit an indication of a shared event on a device-by-device basis. That is, the indications of a shared event may be sent from a central server or otherwise such that they arrive at substantially the same time at each device. In some embodiments, a central server may measure the latency of one or more network hops between the central server and each participating device such that transmissions to the participating device may be timed to arrive at their respective destinations at substantially the same time.

According to some embodiments, devices participating in a shared gaming activity are synchronized by initiating a unique gaming sequence at each of the participating devices. The unique gaming sequence, which may take the form of a "bonus game," for example, has an effect of holding players at the participating devices for a period of time, being the period of time it takes for the sequence to be completed. Thus, so long as the central server is able to transmit an indication of a shared event within that period of time to all participating devices, and each participating device receives its respective indication during that time, and at the end of the unique gaming sequence, each device will provide that indication to respective players at substantially the same time.

According to some embodiments, gaming devices participating in a shared gaming activity may place wagers using non-cash currencies. Where non-casino gaming devices (e.g., mobile phones, personal computers, etc.) are participants in a shared gaming activity, the types of currencies that may be used for a particular activity may be wider ranging than those that might traditionally have been used in casino gaming. For example, reward points associated with any suitable credit-based loyalty program may be used as a currency, which may include air miles, casino rewards (e.g., Total Rewards), etc.

Following below are more detailed descriptions of various concepts related to, and embodiments of, techniques of synchronizing devices participating in a shared gaming activity. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 depicts an illustrative system suitable for practicing techniques for synchronizing devices participating in a shared gaming activity, according to some embodiments. As discussed above, embodiments provide for a wide range of devices to collectively participate in a shared gaming activity. System 100 illustrates one such system in which two gaming devices 110 and 120 participate in a shared gaming activity by communicating with server 130, which coordinates the activity.

Server 130 may coordinate any suitable shared gaming activity by sending and/or receiving data from gaming devices 110 and 120, including any gaming activity that includes cooperation of and/or competition between participating players. Any number of gaming devices may participate in the shared gaming activity, and illustrative gaming devices 110 and 120 are depicted in system 100 merely as examples. According to some embodiments, server 130 may coordinate a shared gaming activity in which gaming outcomes are temporally tightly linked to actions of participants. For example, the shared gaming activity may include activities in which outcomes are to be provided to participants within a small time window after an action by a participant (e.g., a time window of less than three seconds, less than one second and/or less than a hundred milliseconds).

Gaming devices 110 and 120 may include any suitable device on which a gaming application may be executed, including but not limited to: casino gaming machines, personal computers, mobile devices (e.g., tablets, phones, etc.), lottery machines, or combinations thereof. According to some embodiments, gaming devices 110 and 120 are different types of gaming devices, for instance gaming device 110 may be a casino gaming device and gaming device 120 may be a mobile device.

Either, both or neither of gaming devices 110 and 120 may present one or more gaming activities to a user of the respective gaming device, in addition to the shared gaming activity coordinated by server 130. For example, gaming devices 110 and/or 120 may present one or more MDW gaming activities to users of those devices, such as MDW activities that involve wagering. Such MDW gaming activities may or may not be associated with the shared gaming activity. In some cases, playing of an MDW gaming activity at gaming device 110 and/or gaming device 120 may inherently result in participation with a shared gaming activity coordinated by server 130. Additionally, or alternatively, playing of an MDW gaming activity at gaming device 110 and/or gaming device 120 may be a requirement for participation with a shared gaming activity coordinated by server 130. For example, where the shared gaming activity includes a progressive jackpot, a wager for an MDW gaming activity at a gaming device may contribute to the progressive jackpot, and/or may cause the player that placed the wager to become eligible to be awarded the progressive jackpot.

Gaming devices 110 and 120 may each communicate with server 130 via communication channels 115 and 125, respectively, which may include any number of wired or wireless communication channels. As used herein, the term "communication channel" refers to a logical or physical link between devices. According to some embodiments, gaming devices 110 and/or 120 may communicate with server 130 via only wired communication channels. For example, a gaming device may be a casino gaming device and may communicate with a local casino controller (e.g., a floor controller) via a first wired communication channel, which communicates with a casino server via a second wired communication channel, which communicates with server 130 via a third wired communication channel. This is merely one such example of a series of wired communication channels between a gaming device and server 130, however, as any suitable collection of communication channels may generally be used. According to some embodiments, gaming devices 110 and/or 120 may communicate with server 130 via at least one wireless communication channel. For example, a gaming device may communicate with server 130 via a local wireless device, such as a router. According to some embodiments, gaming devices 110 and/or 120 may communicate with server 130 via the Internet.

According to some embodiments, gaming devices 110 and 120 may send indications of wagers to server 130. This may include indications of wagers placed within MDW gaming activities provided by gaming device 110 and/or gaming device 120. For example, an indication of a wager placed within an MDW gaming activity at a respective gaming device may be sent to server 130 so that the wager may contribute or otherwise affect a shared jackpot to be later awarded by server 130. Additionally, or alternatively, indications of wagers being placed to a shared gaming activity provided by server 130 may be sent from gaming device 110 and/or gaming device 120 to the server. For example, an indication of a wager being placed for a lottery or keno game provided by server 130 may be sent to the server to place that wager within the game.

According to some embodiments, server 130 may determine an outcome of a shared gaming activity. For example, an outcome may include determining one or more prizes to be given to one or more participants in the shared gaming activity. Such a determination may be made in response to received indications of wagers from one or more participants, when particular events occur, and/or otherwise. According to some embodiments, server 130 may send an indication of an outcome of a shared gaming activity to gaming devices 110 and/or 120. For example, when a recipient of a prize for a shared jackpot is determined, an indication of a win may be sent to the recipient's gaming device, and in some cases, an indication of a non-win may also be sent to one or more other gaming devices.

According to some embodiments, server 130 may determine a schedule for a shared gaming activity. As discussed above, a schedule may compensate for latency of communications between server 130 and each of gaming devices 110 and 120 by enabling the gaming devices to present the occurrence of a shared event at substantially the same time. Determination of a schedule may be based on any number of indications of wagers received by the server that relate to the shared gaming activity, and in some cases the server may utilize historical data describing received indications of wagers (which may include records of the indications themselves and/or data derived from the indications) to determine the schedule. Server 130 may provide an indication of the determined schedule and/or may provide instructions based on the determined schedule to gaming device 110 and gaming device 120 in any suitable way.

According to some embodiments, server 130 may measure latencies of communication between the server and each of gaming devices 110 and 120. This may include a measurement of the total latency (e.g., time to destination and/or round trip time) and/or may include measurements of latency for one or more network hops between the server 130 and the respective gaming device. Such measurements may be made a number of times (e.g., periodically) such that an average measurement may be obtained and/or so that a recent estimate of the latency of communication may be obtained.

According to some embodiments, server 130 may send an instruction to initiate a unique gaming sequence to gaming devices 110 and 120. As discussed above, a unique gaming sequence may have an effect of holding players at the gaming devices giving the server a time window in which to provide an outcome to the gaming devices such that, at the end of the gaming sequence, the gaming devices may present the outcomes at substantially the same time. In some cases, a number of unique gaming sequences may be utilized for a shared gaming activity and the instruction sent by server 130 may indicate which of the unique gaming sequences is to be initiated. Additionally, or alternatively, the unique gaming sequence initiated by the server 130 may be randomly selected, either for gaming devices 110 and 120 as a whole, or for each of the gaming devices independently.

According to some embodiments, server 130 may perform tracking of players participating in a shared gaming activity via gaming devices such as gaming devices 110 and 120. This may include authentication of user credentials with the server to identify a player (e.g., which may allow the player to access previously stored funds), and/or to log gaming activities of users over time.

Figure 2:
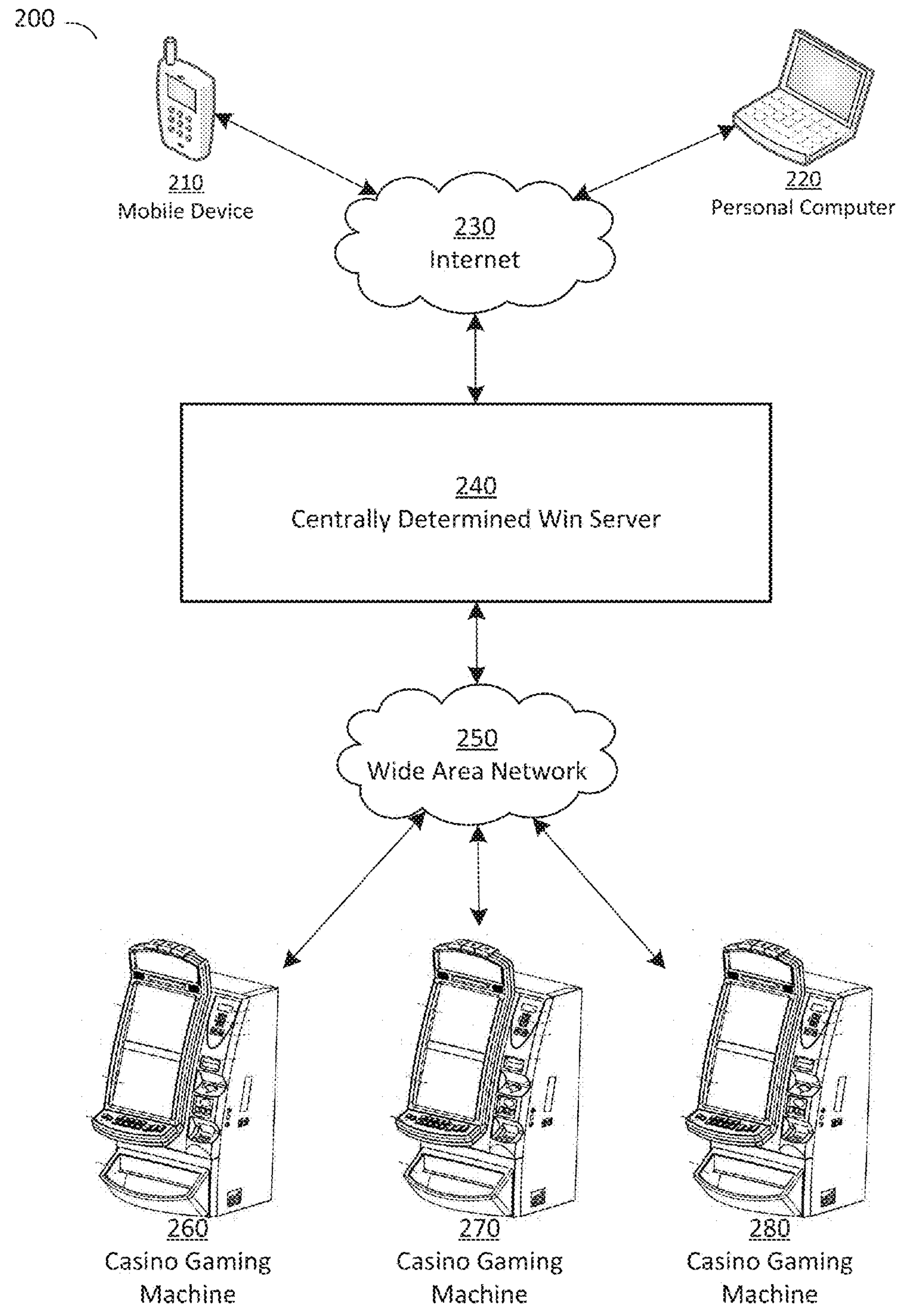
FIG. 2 depicts an illustrative system in which several devices participate in a shared gaming activity via a centrally determined win server, according to some embodiments.

FIG. 2 depicts an illustrative system in which several devices participate in a shared gaming activity via a centrally determined win server, according to some embodiments. System 200 includes five gaming devices, namely mobile device 210, personal computer 220 and casino gaming machines 260, 270 and 280. It will be appreciated that, in general, a system may include any number of any type of gaming devices, and that system 200 includes these five illustrative gaming device merely as one example of such a system. Centrally determined win server 240 coordinates one or more shared gaming activities in which gaming devices 210, 220 and 260-280 participate.

In the example of FIG. 2, mobile device 210 and personal computer 220 communicate with server 240 via the Internet, whereas casino gaming machines 260-280 communicate with server 240 via a wide area network 250. As discussed above, techniques described herein may be used to synchronize gaming devices when participating in a shared gaming activity. Accordingly, system 200 may be configured, using the techniques described herein, to present an outcome of the shared gaming activity to gaming devices 210, 220 and 260-280 at substantially the same time even though the communications latency between devices 210 and 220 with server 240 may be expected to be significantly greater than the latency of devices 260-280 with the server.

Mobile device 210 may include any suitable handheld computing device, including any tablet, mobile phone, PDA, etc. Personal computer 220 may include any general purpose computer. Mobile device 210 and personal computer 220 may each include one or more dedicated applications that provide access to a shared gaming activity coordinated by server 240, and/or may provide access to the shared gaming activity via browser software (e.g., a web browser). In addition, either, both, or neither of mobile device 210 and personal computer 220 may provide MDW gaming capabilities (e.g., wagering activities in which an outcome can be determined without communication with server 240). Such MDW gaming activities may, or may not, be related to the shared gaming activity coordinated by server 240, as discussed above.

According to some embodiments, mobile device 210 and/or personal computer 220 may provide authentication credentials to server 240 to identify a user accessing the respective device. For example, software executed by a device that provides access to the shared gaming activity may request login information for a user, and this login information may be authenticated by server 240 or otherwise before providing access to the activity. Centrally determined win server 240 may perform tracking of users participating in the shared gaming activity, as discussed above.

Casino gaming machines 260, 270 and 280 may include any gaming machines located within a casino or within different casinos. An example of such a gaming machine is discussed below in relation to FIG. 8. The casino gaming machines 260-280 may communicate with server 240 via wide area network 250, which may be connected to one or more local area networks in which one or more of the casino gaming machines are located. For example, the casino gaming machines 260-280 may be part of a casino's local area network, which has a local controller through which the devices communicate with the wide area network and server 240.

According to some embodiments, gaming devices 210, 220 and 260-280 may send indications of wagers to server 240. As discussed above in relation to FIG. 1, such indications may relate to wagers placed for MDW and/or CDW games (e.g., a local game for which a wager contributes to a progressive jackpot and/or a lottery or keno game provided by the server). The indications may be sent from each device using the same, or using different message protocols and/or message data formats. For example, an application executing on mobile device 210 may produce an indication of a wager having a first message data format and may transmit the indication to server 240 using a first message protocol. Casino gaming device 260, on the other hand, may produce an indication of a wager using a different message data format and/or may transmit its indication to server 240 using a different message protocol. Server 240 may accordingly be configured to receive and interpret messages provided via any of multiple message protocols and/or in any of multiple message data formats.

According to some embodiments, centrally determined win server 240 may determine an outcome of a shared gaming activity, such as a progressive jackpot or a lottery prize. The server may send indications of the determined outcome to any one or more of gaming devices 210, 220 and 260-280, and may do so based on message data formats and/or message protocols being used by the destination gaming device, as discussed above.

According to some embodiments, server 240 may perform one or more techniques for synchronizing the server with gaming devices 210, 220 and 260-280, including but not limited to, determining a schedule for a shared gaming activity, measuring latencies of communication between the server 240 and one or more of gaming devices 210, 220 and 260-280, and/or sending an instruction to initiate a unique gaming sequence to one or more of gaming devices 210, 220 and 260-280.

Figure 3:
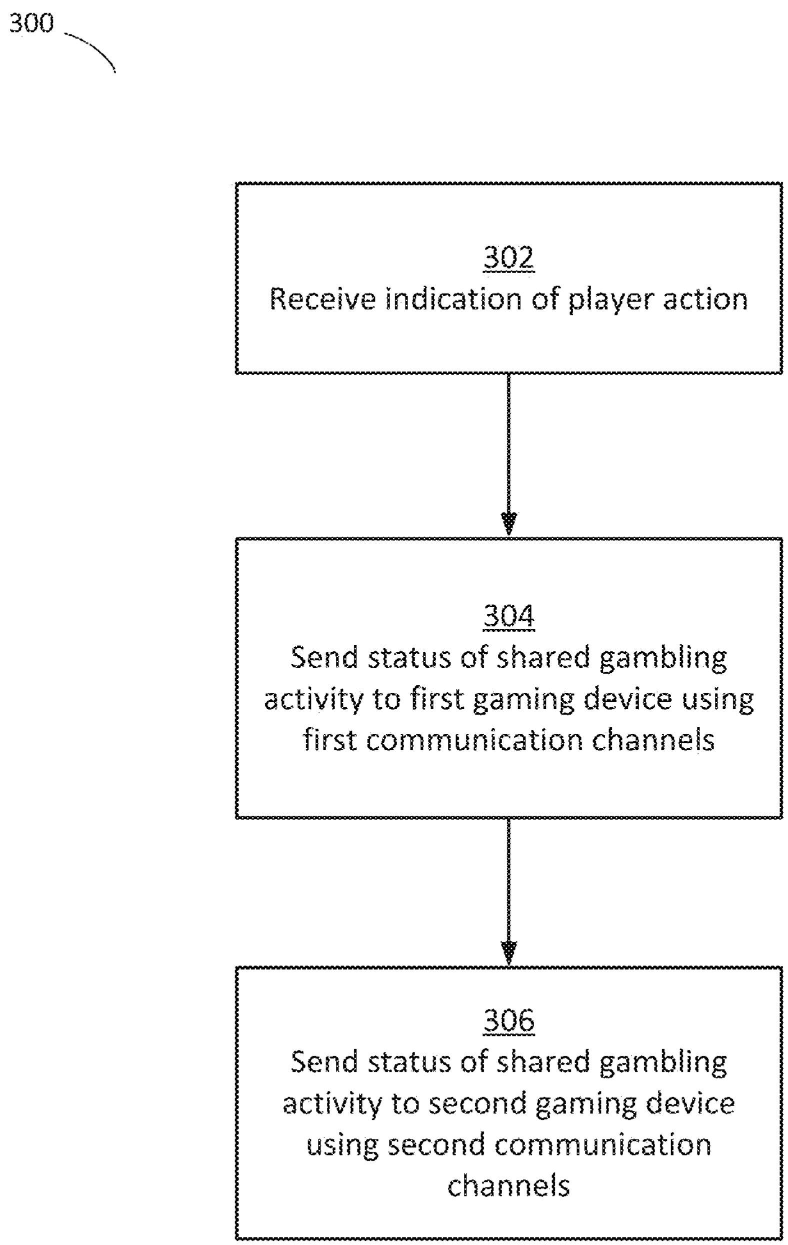
FIG. 3 is a flow chart of an illustrative method of synchronizing a shared gaming activity with multiple devices by a server, according to some embodiments.

FIG. 3 depicts an illustrative method of synchronizing a shared gaming activity with multiple devices by a server, according to some embodiments. Method 300 may be performed by a server coordinating one or more shared gaming activities, such as server 130 shown in FIG. 1 and/or server 240 shown in FIG. 2.

In act 302, an indication of player action is received from a gaming device. The player action may include any action taken by a player at a gaming device wherein the player is, or may subsequently, participate in a shared gaming activity being coordinated by the server executing method 300. According to some embodiments, the indication of player action includes an indication of a wager placed at a gaming device. As discussed above, an indication of a wager may relate to a wager placed for an MDW and/or a CDW game (e.g., a local game for which a wager contributes to a progressive jackpot and/or a lottery or keno game provided by the server). According to some embodiments, an indication of player action received in act 302 indicates the status of a player within a shared gaming activity being coordinated by the server executing method 300. For example, the indication of player action may include an indication that a player is joining the shared gaming activity or that a player is leaving the shared gaming activity.

In act 304, a status of a shared gaming activity being coordinated by the server executing method 300 is sent to a first gaming device that is participating in the shared gaming activity. The status may include an outcome of the shared gaming activity, such as an indication that the first gaming device has, or has not, won a prize (e.g., a jackpot). According to some embodiments, the status may include a schedule for the shared gaming activity and/or an instruction to initiate a unique gaming sequence. According to some embodiments, sending of the status in act 304 may be performed based on a measure of communication latency between the server executing method 300 and the first gaming device. For example, sending of the status may be timed based on the latency so as to arrive at the first gaming device at a particular time. Sending of the status in act 304 is performed via first communication channels, which may include any number of wired and/or wireless communication channels.

In act 306, the status of the shared gaming activity sent in act 304 is sent to a second gaming device participating in the shared gaming activity. According to some embodiments, sending of the status in act 306 may be performed based on a measure of communication latency between the server executing method 300 and the second gaming device. For example, sending of the status may be timed based on the latency so as to arrive at the second gaming device at a particular time. Sending of the status in act 306 is performed via second communication channels, which may include any number of wired and/or wireless communication channels.

According to some embodiments, the first and second gaming devices to which the status is sent in acts 304 and 306 may be different types of gaming devices. For example, the first gaming device may be a casino gaming machine and the second gaming device may be a mobile device. According to some embodiments, the first and second communication channels are a different set of communication channels. For example, the first communication channels may include at least one wireless communication channel whereas the second communication channels may be composed only of wired communication channels.

Figure 4A:
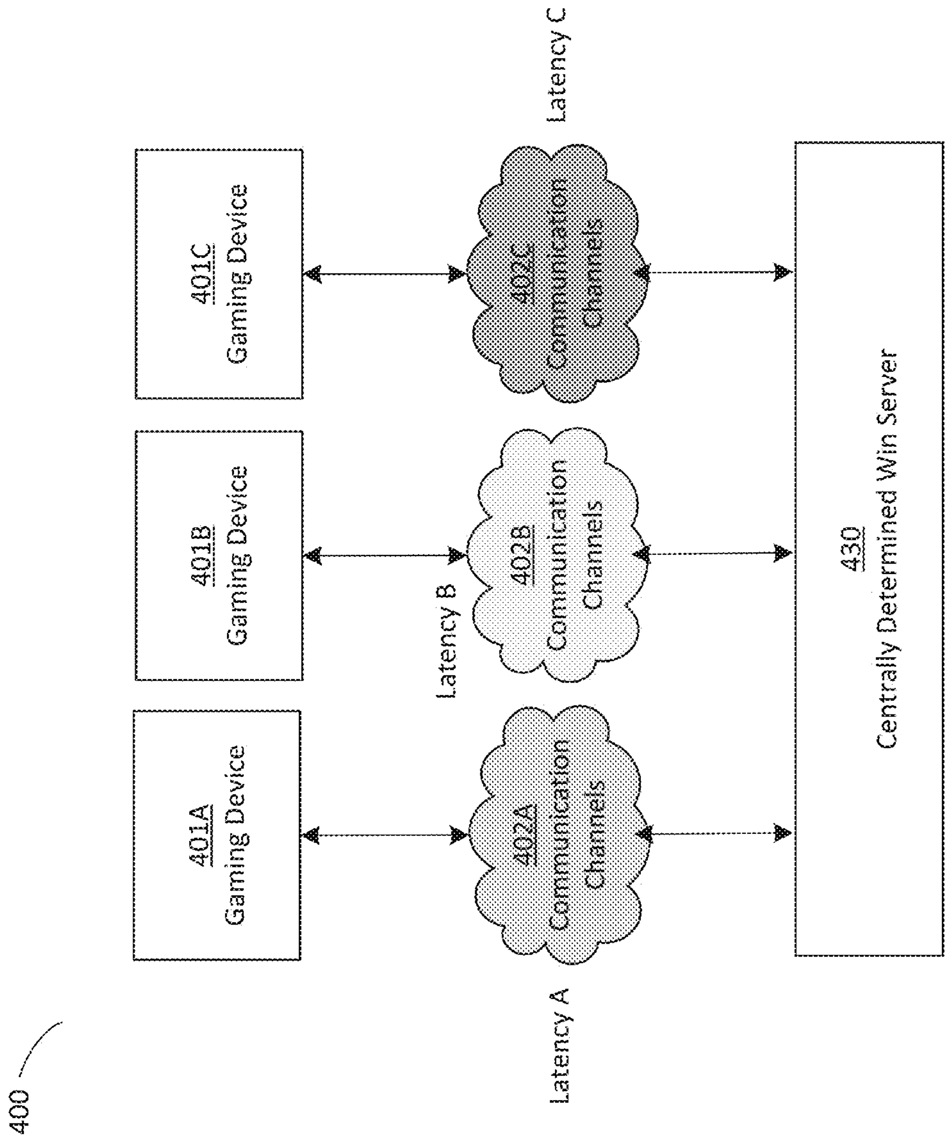
FIGS. 4A-C depict illustrative techniques of synchronizing devices participating in a shared gaming activity based on the latency of each device, according to some embodiments.
Figure 4B:
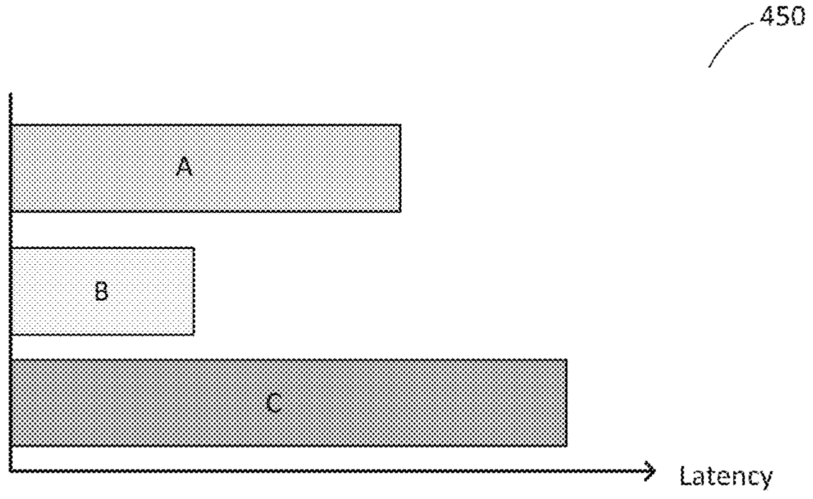
Figure 4C:
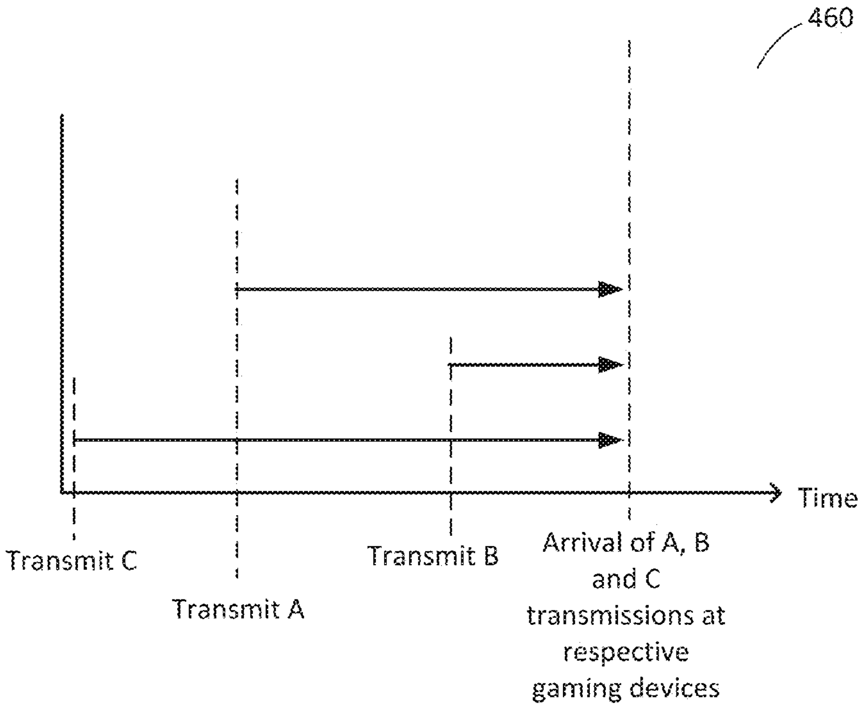

As discussed above, the inventors have recognized and appreciated that one technique for synchronizing devices participating in a shared gaming activity may be performed by measuring the communication latency of the devices. FIGS. 4A-C depict illustrative techniques for synchronizing such devices based on the measured latency of each device, according to some embodiments. System 400 shown in FIG. 4A illustrates three gaming devices 401A-C which communicate with a centrally determined win server 430 via respective sets of communication channels 402A-C. Each set of communication channels, which may each include any number of wired and/or wireless communication channels, is associated with a latency that represents the time for communication to propagate from the server to a respective gaming device (one-way latency).

The latencies of each set of communication channels 402A-C may have been determined in any suitable way, including by measuring the one-way and/or round-trip latencies between a respective gaming device and the server 430 any number of times. For example, each of latencies A, B and C used in the example of FIGS. 4A-C may represent a minimum observed one-way latency, a maximum observed one-way latency or an average observed one-way latency from the server 430 to a respective gaming device based on some number of latency measurements. Latencies may be measured by server 430 or otherwise using any suitable tool, including but not limited to ping, paketto, traceroute, NetPerf, etc.

Latencies A, B and C used in the example of FIGS. 4A-C are shown in FIG. 4B. Latency C has the highest value of the three illustrative latencies, and latency A the lowest value. That is, communication from server 430 to gaming device C takes the longest amount of time, whereas communication from server 430 to gaming device A takes the shortest amount of time.

As discussed above, synchronization of devices participating in a shared gaming activity with a server may be performed by selecting a time to transmit an indication of a shared event from the server on a device-by-device basis. That is, the indications of a shared event may be sent from a server 430 such that they arrive at substantially the same time at each of gaming devices 401A-C. As shown in FIG. 4C, an indication of a shared event may be sent to each of gaming devices 401A-C such that the indications arrive at substantially the same time by selecting the transmission times of the indications based on latencies associated with a respective gaming device. For example, since latency C associated with gaming device 401C is the highest latency, transmission of the indication is first made to gaming device 401C. At a later time, based on the observed latencies, transmission of the indication is made to gaming device 401A, and finally to gaming device 401B. As shown in FIG. 4C, this results in arrival of the indications at all three gaming devices at substantially the same time.

Figure 5A:
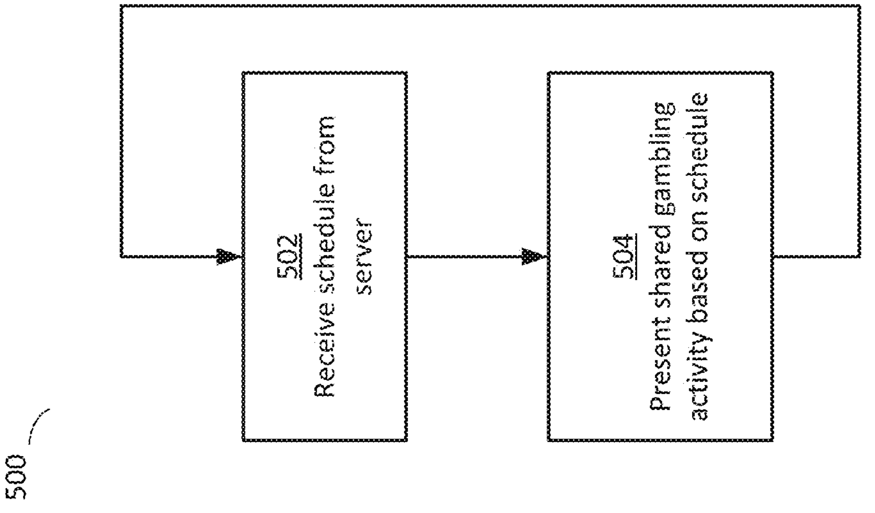
FIGS. 5A-D depict illustrative techniques of synchronizing devices participating in a shared gaming activity based on a schedule, according to some embodiments.

As discussed above, the inventors have recognized and appreciated that one technique for synchronizing devices participating in a shared gaming activity may be performed by sending a schedule to the devices. The schedule may indicate a future time at which a shared event, such as awarding of a jackpot, is to occur. By providing an indication of the schedule to each of the participating devices, and/or to devices having a low communication latency with participating devices, the participating devices may identify the occurrence of the shared event at substantially the same time. Method 500 shown in FIG. 5A may be performed by any suitable gaming device participating in a shared gaming activity. In method 500, the gaming device receives a schedule and presents a shared gaming activity based on the received schedule.

In act 502, a schedule is received from a server. According to some embodiments, the schedule may indicate predetermined times at which a shared event (e.g., awarding of a prize) is permitted to occur. In some cases, the schedule may indicate a regular pattern of such times (e.g., every 30 seconds), which may mitigate or reduce the need for the server to indicate such predetermined times at future times (since the gaming device may then predict future times based on the pattern). As discussed above, this may provide the server with a wider time window in which to send an indication of a shared event to a number of gaming devices and to have the gaming devices receive the indication than may typically be available in a CDW scenario.

According to some embodiments, the schedule received in act 502 may include an indication of how a jackpot is to be presented over time. As discussed above, such an indication may be based on extrapolation of any factors that lead to a determination of a shared jackpot size. For example, a server sending the schedule to the gaming device performing method 500 may have extrapolated the jackpot size to future times based on factors that lead to determining the jackpot size (e.g., number of wagers placed per second, size of wagers, etc.). An indication of extrapolated values, which may include instructions to the gaming device as how to present the jackpot value over time, may be sent to the gaming device in act 502.

According to some embodiments, the schedule received in act 502 may include an indication of a prize value. A server sending the schedule to the gaming device performing method 500 may have identified an amount of a prize to be subsequently awarded to a winning gaming device, which may or may not eventually turn out to be the gaming device performing method 500. Nonetheless, the award value may be indicated to the gaming device performing method 500 so that, for example, the gaming device may display the award value to a player in act 504.

According to some embodiments, the schedule received in act 502 may include an indication of a prize award time at which a prize will be awarded for a shared gaming activity. Such an indication may, for example, indicate a time aligned with a previously indicated set of times at which a shared event is permitted to occur. In such cases, the indication of the prize award time may be received before the prize award time and after a time at which a shared event is permitted to occur that is previous to the prize award time. In some cases, the indication of the prize award time may be accompanied by an indication of whether the gaming device performing method 500 will, or will not, be awarded the prize. Such an indication may be held by the gaming device for a period of time until presentation of the result of the prize award occurs (e.g., presenting that a winner was selected and/or whether the user of the gaming device was a winner).

In act 504, a shared gaming activity in which the gaming device performing method 500 is participating is presented based on the schedule received in act 502. Presenting may include producing any visual and/or audible indications with the gaming device such that one or more aspects of the shared gaming activity are communicated to a user. For example, visual indications of an awarded prize amount, a prize amount that changes over time, that a prize has been awarded to the user, that a prize has not be awarded to the user, a name of the prize winner and/or combinations thereof may be presented to a user.

Figure 5B:
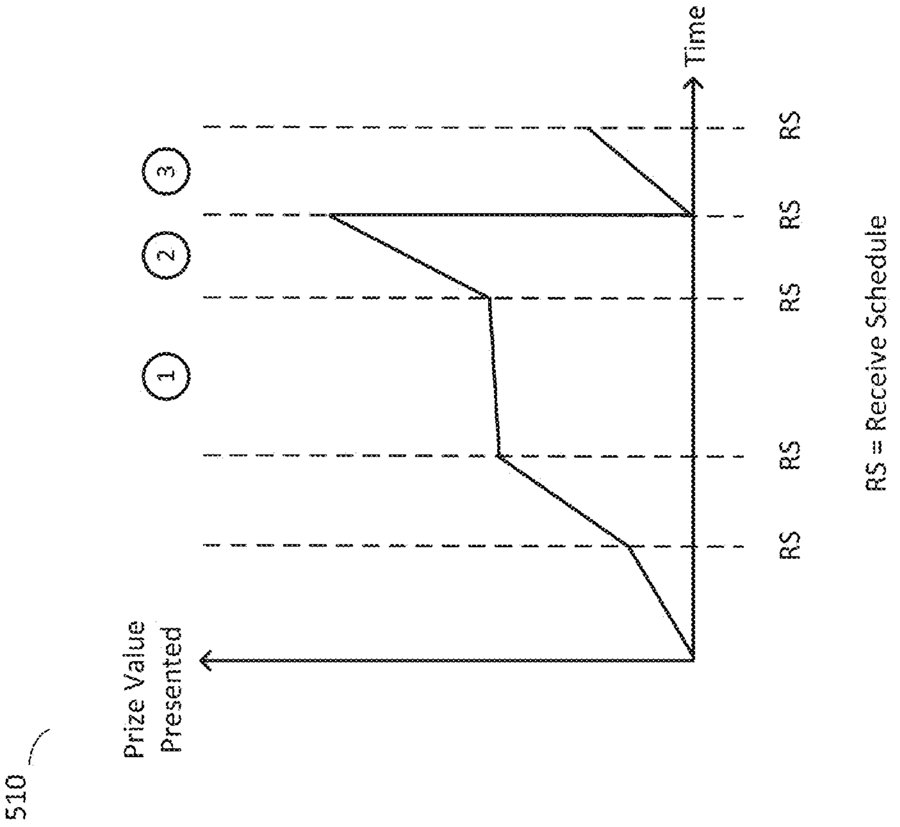

FIG. 5B illustrates a technique for presenting a prize amount that changes over time to a user of a gaming device participating in a shared gaming activity, according to some embodiments. In chart 510, a value of a prize that is presented to a user is shown along the vertical axis, and time is shown along the horizontal axis. In the example of FIG. 5B, the gaming device receives, at times marked "RS," a schedule from a server coordinating the shared gaming activity. As discussed above, such a schedule may include an indication of how a prize amount is predicted to change over time. Once the gaming device receives the rate of change of the prize amount, it presents the prize value based on this rate of change until a new schedule is received from the server. Thus, while no further information may be received by the gaming device between receipts of a schedule, the prize amount may nonetheless be automatically increased. As discussed above, this amount may represent some deviation from a correct amount in the prize pool, however in many cases the deviation may be sufficiently small so that a player will not be aware of it.

In the illustrative case shown in FIG. 5B, in the time window labeled "1" the prize value increases at a fixed rate indicated by the schedule received at the beginning of that time window. At a later time, being at the end of the time window "1" and the beginning of the time window labeled "2," a new schedule is received that indicates a faster rate of increase that was indicated by the previous schedule (e.g., perhaps as a result of players anticipating an upcoming jackpot award). At the end of the time window "2," a jackpot is awarded and a schedule is received that indicates the prize value presented is to return to zero and begin increasing at a new rate (in time window "3").

Figure 5C:
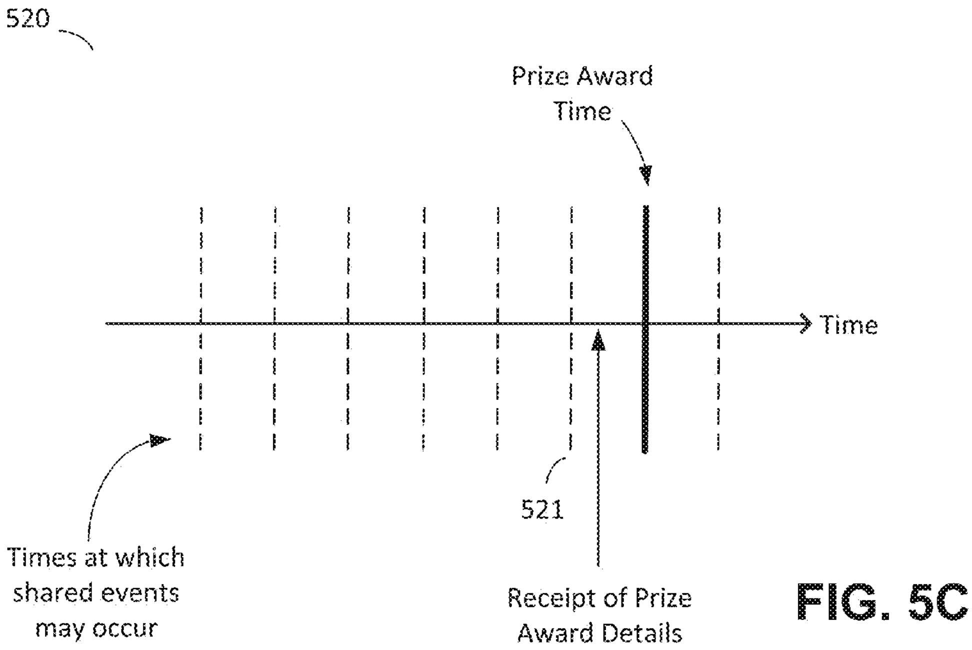

FIG. 5C illustrates a technique for limiting awarding of a prize amount to predetermined times, according to some embodiments. In chart 520, time is shown along a horizontal axis and times at which shared events in a shared gaming activity are permitted to occur are marked by broken lines. As discussed above, such predetermined times may be specified to a gaming device participating in the shared gaming activity as part of a transmitted schedule. Furthermore, the predetermined times may be synchronized between the gaming devices, which may for example be performed by synchronizing timers of the gaming devices (e.g., to within less than 100 milliseconds, or less than 10 milliseconds).

In the example of FIG. 5C, a schedule is received by the gaming device subsequent to permitted time 521 and prior to the next permitted time that indicates a prize is to be awarded at the next permitted time (labeled as "Prize Award Time"). As discussed above, the schedule may in some cases further include a prize amount and/or an indication of whether the user of the gaming device won the prize or not. While the gaming device receives the prize award details at the time indicated in FIG. 5C, it does not present any details of the prize award to the user of the device, but rather waits until the prize award time shown in the figure to present the details. Accordingly, where other gaming devices are synchronized to use the same times at which shared events may occur, other gaming devices receiving the prize award details between permitted time 521 and the prize award time will present the details of the prize award at substantially the same time.

Figure 5D:
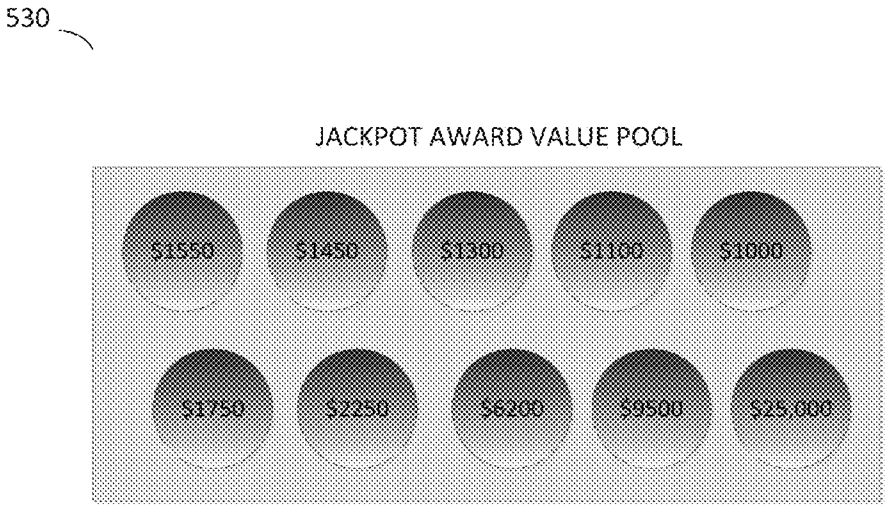

FIG. 5D illustrates a "pull-tab" prize system that may be used in awarding of a prize, according to some embodiments. In cases described herein in which the awarding of a prize is known to occur at some future scheduled time (e.g., any examples discussed above in relation to FIGS. 5A-C), a pool of predetermined prize values may be selected, such as those shown in FIG. 5D. When a prize is awarded, it may be removed from the pool until the pool is emptied, at which point the pool is repopulated. Alternatively, a prize may be awarded more than once before it is removed from the pool. In either case, the total awards that may be provided by the full pool is known ahead of time. Where prize awards may be scheduled in advance (even if only a matter of seconds in advance), it may be ensured that the full pool of prizes will be awarded within a particular fixed window of time (e.g., by randomly selecting scheduled prize award times within the fixed window). Accordingly, the total prize liability during a fixed window may be known, and prize amounts may be set accordingly to ensure a profit.

Figure 6:
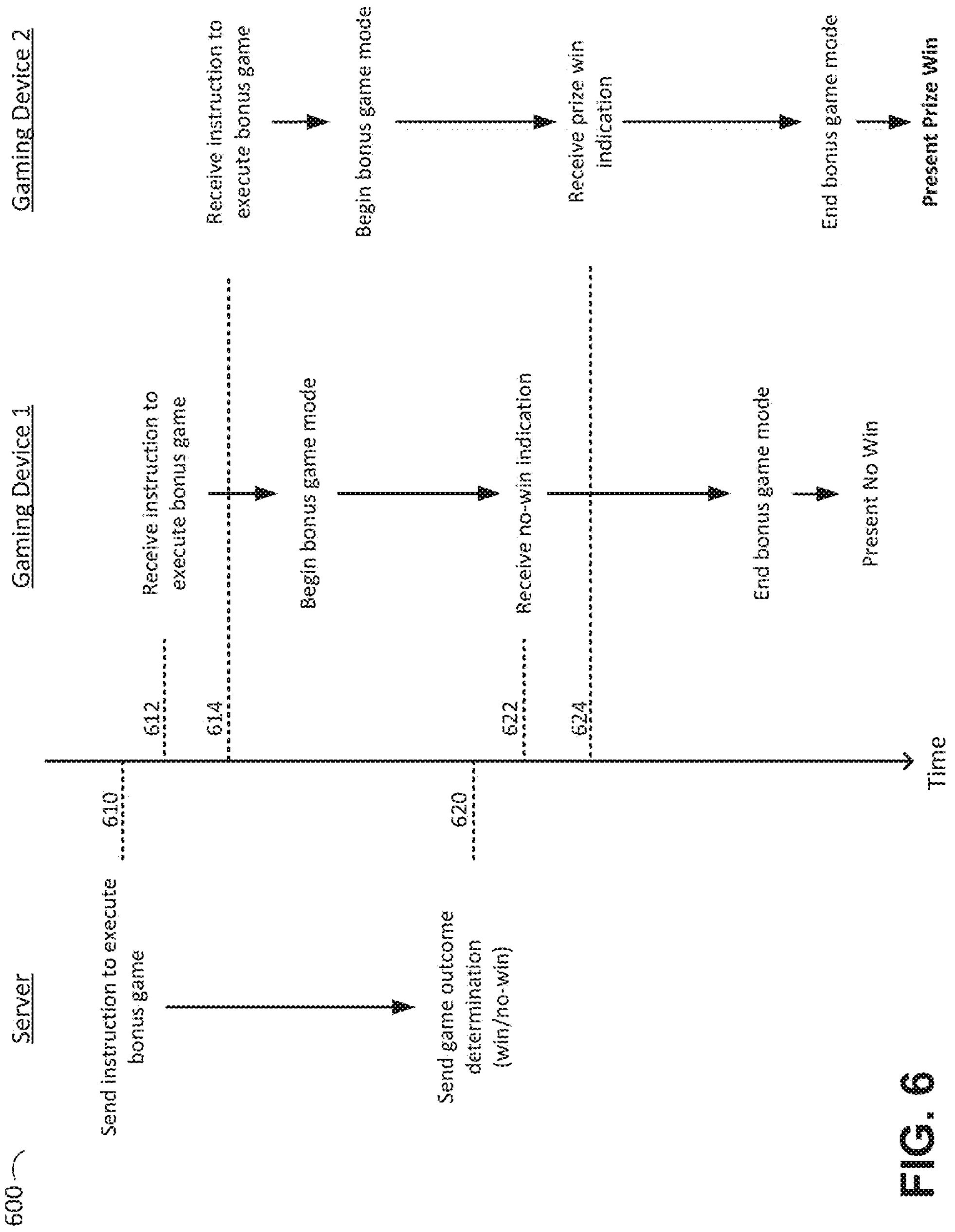
FIG. 6 depicts an illustrative technique of synchronizing devices participating in a shared gaming activity by entering a unique gaming sequence, according to some embodiments.

As discussed above, the inventors have recognized and appreciated that one technique for synchronizing devices participating in a shared gaming activity is to initiate a unique gaming sequence at each of the participating devices. The unique gaming sequence has an effect of holding players at the participating devices for a period of time, being the period of time it takes for the sequence to be completed. FIG. 6 depicts an illustrative use of this technique, according to some embodiments.

In the example of FIG. 6, time increases in the downward direction along the vertical axis. A server, shown at the left side of the figure, sends messages to two gaming devices, shown in the right side of the figure. In the example of FIG. 6, the two gaming devices exhibit different one-way communication latencies from the server to the respective gaming device, with gaming device 2 having a greater one-way communication latency.

At time 610, the server sends instructions to the two gaming devices to initiate a bonus game, being an example of a unique gaming sequence discussed above. The bonus game may be a sequence that will be executed by the gaming devices that takes a known length of time to complete (e.g., >20 seconds). At time 612, gaming device 1 receives the instruction and begins to execute the bonus game mode. At time 614, gaming device 2 receives the instruction and begins to execute the bonus game mode, later than the time at which gaming device 1 begins the bonus game mode.

During the period in which gaming devices 1 and 2 are executing the bonus game mode, the server sends an indication of whether each gaming device has won a prize to each device. Which gaming device has won a prize, if any, may be determined by the server subsequent to, or prior to, time 610. In the example of FIG. 6, gaming device 2 is awarded a prize, whereas gaming device 1 is not. At time 622, gaming device 1 receives the indication that it has not been awarded a prize, and at time 624 gaming device 2 receives the indication that it has been awarded a prize. Subsequent to time 624, each of gaming devices 1 and 2 complete executing the bonus game mode, at which time each gaming device may present indications of the bonus game outcome. For example, gaming device 1 may indicate that it was not awarded a prize, whereas gaming device 2 may indicate that it was awarded a prize.

Accordingly, the bonus game mode provides an extended time window in which a game outcome determination may be communicated to gaming devices. According to some embodiments, the bonus mode may prohibit users of the gaming devices from cashing out or otherwise ceasing their participation in the shared gaming activity to ensure that they remain connected to or physically present at the gaming device until the bonus mode has completed.

Figure 7:
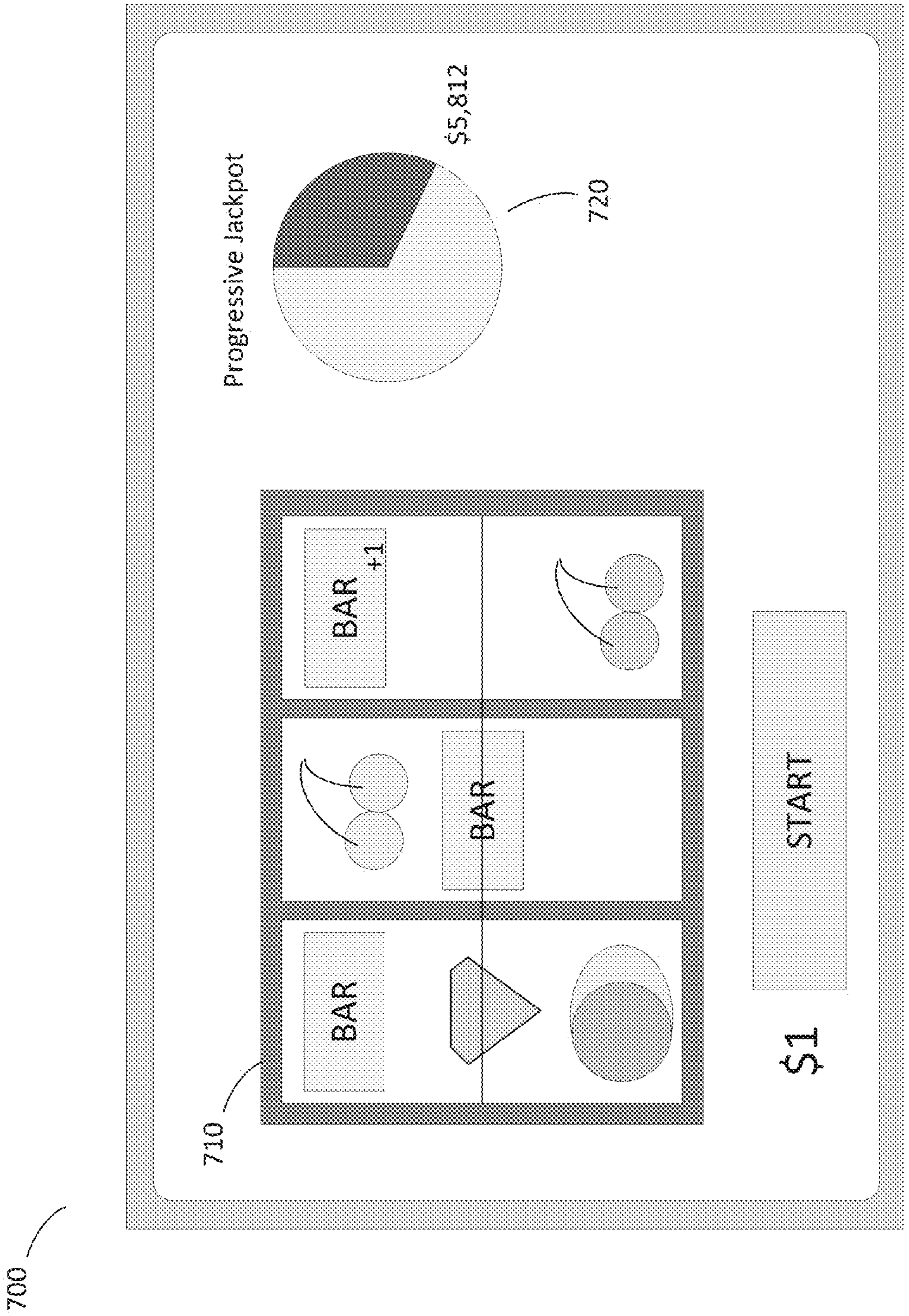
FIG. 7 depicts an illustrative electronic gaming interface, according to some embodiments.

FIG. 7 depicts an illustrative electronic gaming interface, according to some embodiments. Interface 700 includes pay lines 710 and progressive jackpot indication 720. The interface 700 may be displayed in any suitable way on any suitable gaming device, including on a casino gaming machine, on a personal computer and/or on a mobile device. In some cases, the progressive jackpot indication may be displayed on a different display to pay lines 710, such as a display within a casino cabinet that displays pay lines 710 and/or on a display external to the cabinet (e.g., an overhead display in a casino).

Figure 8:
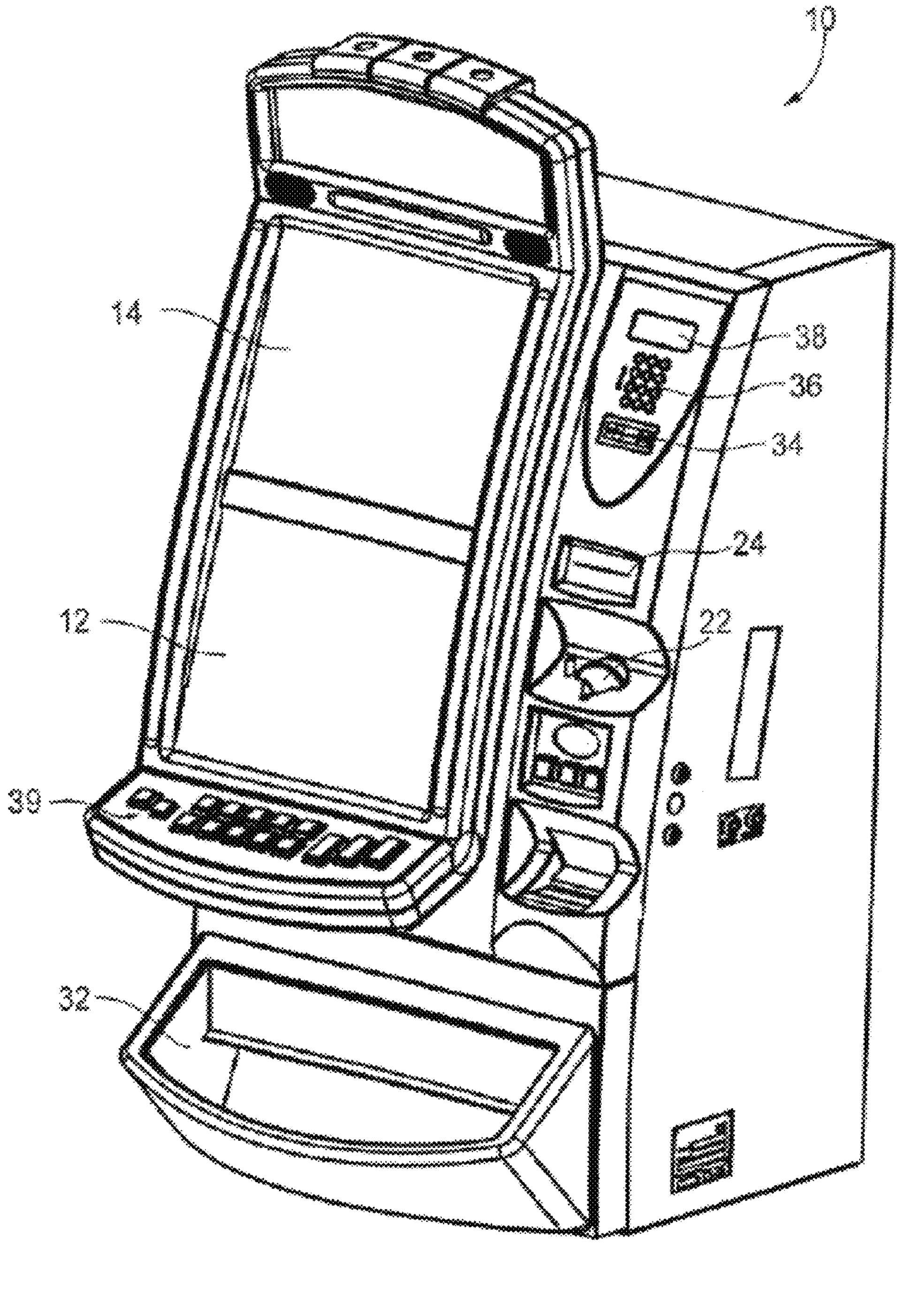
FIG. 8 is a perspective view illustrating an illustrative cabinet housing a casino gaming machine in accordance with some embodiments.

FIG. 8 shows a perspective view of an illustrative cabinet 10 housing a casino gaming machine in accordance with some embodiments. Illustrative cabinet 10, as depicted in FIG. 8, includes a display 12, a second display 14, a coin slot 22, a coin tray 32, a card reader slot 34, a keypad 36, and player control buttons 39.

Display 12 may include at least one three-dimensional (3D) display for displaying 3D images of one or more 3D environments (e.g., virtual or real-world 3D environments). Embodiments of the 3D display device may be implemented using any suitable type of display component, including, without limitation, a thin film transistor (TFT) display, a liquid crystal display (LCD), a cathode ray tube (CRT) display, a light-emitting diode (LED) display, and/or an organic LED (OLED) display.

Second display 14 may provide game data or other information in addition to the information provided by display 12. Display 14 may provide static information, such as an advertisement for the game, the rules of the game, pay tables, pay lines, and/or other information, and/or may even display the main game or a bonus game along with display 12. Alternatively, the area for display 14 may be a display glass for conveying information about the game.

Display 12 and/or display 14 may have a touch screen lamination that includes a transparent grid of conductors. A player touching the screen may change the capacitance between the conductors, and thereby the X-Y location of the touch on the screen may be determined. A processor within cabinet 10 may associate this X-Y location with a function to be performed. There may be an upper and lower multi-touch screen in accordance with some embodiments.

A coin slot 22 may accept coins or tokens in one or more denominations to generate credits within the casino gaming machine for playing games. An input slot 24 for an optical reader and printer may receive machine readable printed tickets and may output printed tickets for use in cashless gaming.

A coin tray 32 may receive coins or tokens from a hopper (not shown) upon a win or upon the player cashing out. However, in some embodiments, the casino gaming machine may not pay in cash, but may only issue a printed ticket for cashing in elsewhere. Alternatively, a stored value card may be loaded with credits based on a win, or may enable the assignment of credits to an account associated with a computer system, which may be a computer network-connected computer system.

A card reader slot 34 may accept any of various types of cards, such as smart cards, magnetic strip cards, and/or other types of cards conveying machine readable information. The card reader may read the inserted card for player and/or credit information for cashless gaming. The card reader may read a magnetic code on a conventional player tracking card, where the code uniquely identifies the player to the host system. The code may be cross-referenced by the host system to any data related to the player, and such data may affect the games offered to the player by the casino gaming machine. The card reader may also include an optical reader and printer for reading and printing coded barcodes and other information on a paper ticket. A card may also include credentials that enable the host system to access one or more accounts associated with a user. The account may be debited based on wagers by a user and credited based on a win. As discussed above, such accounts may comprise cash or a non-cash currency.

A keypad 36 may accept player input, such as a personal identification number (PIN) and/or any other player information. A display 38 above keypad 36 may display a menu for instructions and/or other information, and/or may provide visual feedback of the keys pressed. The keypad 36 may be an input device such as a touchscreen, or dynamic digital button panel, in accordance with some embodiments.

Player control buttons 39 may include any buttons and/or other controllers usable for the play of the particular game or games offered by the casino gaming machine, including, for example, a bet button, a repeat bet button, a spin reels (or play) button, a maximum bet button, a cash-out button, a display pay lines button, a display payout tables button, select icon buttons, and/or any other suitable button(s). In some embodiments, buttons 39 may be replaced by a touch screen with virtual buttons. In some embodiments, touchless control gesture functionality may replace or coexist with buttons 39.

Figure 9:
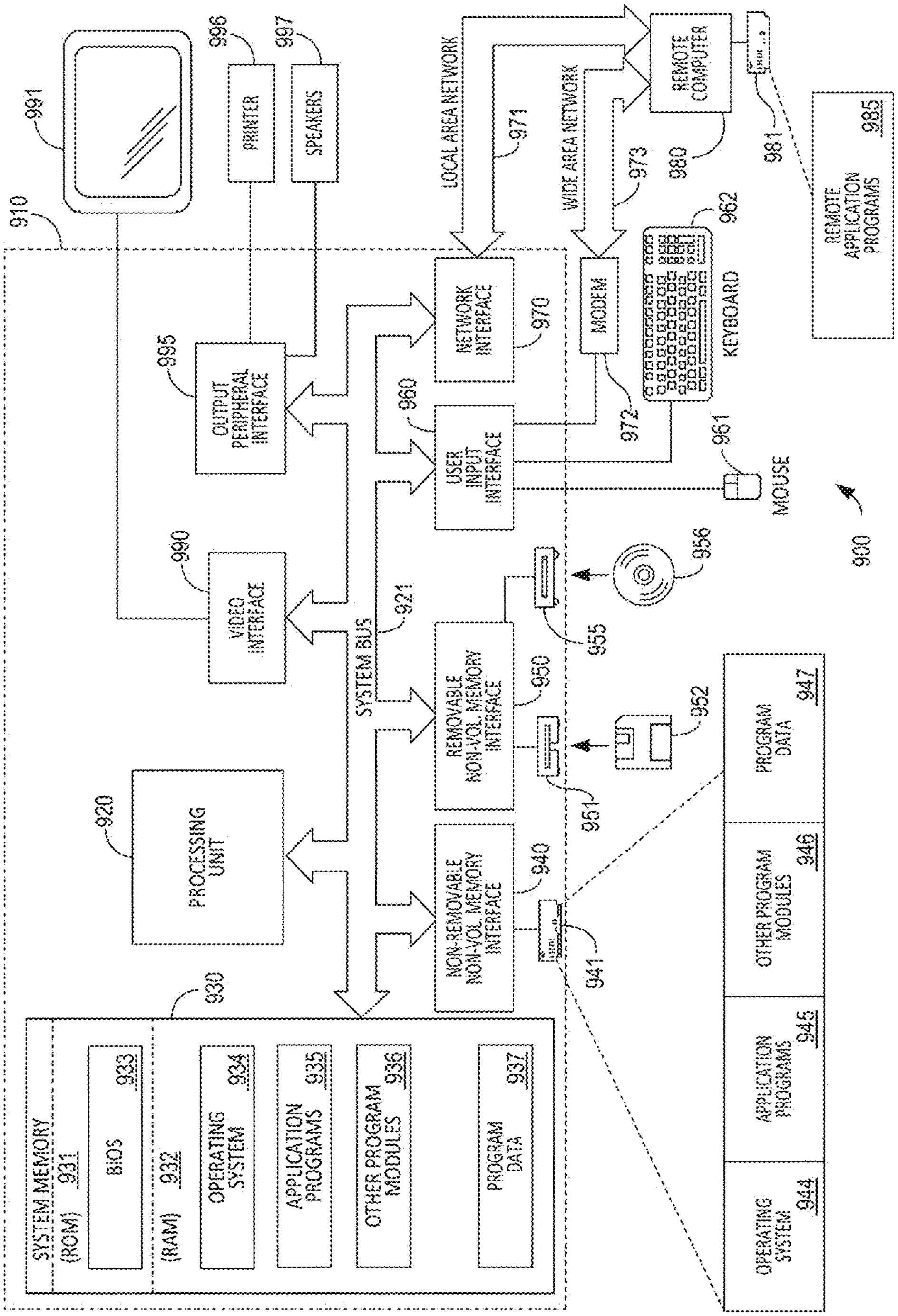
FIG. 9 illustrates an example of a computing system environment on which various embodiments may be implemented.

FIG. 9 illustrates an example of a suitable computing system environment 900 on which the technology described herein may be implemented. The computing system environment 900 is only one example of a suitable computing environment and is not intended to suggest any limitation as to the scope of use or functionality of the technology described herein. Neither should the computing environment 900 be interpreted as having any dependency or requirement relating to any one or combination of components illustrated in the illustrative operating environment 900.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 9, an illustrative system for implementing the technology described herein includes a general purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the illustrative operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are illustrative and other means of establishing a communications link between the computers may be used.

Having thus described several aspects of at least one embodiment, it is to be appreciated that various alterations, modifications, and improvements will readily occur to those skilled in the art.

Such alterations, modifications, and improvements are intended to be part of this disclosure, and are intended to be within the spirit and scope of the disclosure. Further, though advantages are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semi-custom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, embodiments may be implemented as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various embodiments as discussed above. As used herein, the term "computer-readable storage medium" encompasses only a non-transitory computer-readable medium that can be considered to be a manufacture (i.e., article of manufacture) or a machine. Alternatively or additionally, embodiments may be implemented as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various embodiments as discussed above. Additionally, it should be appreciated that according to one aspect of this embodiment, one or more computer programs that when executed perform methods need not reside on a single computer or processor, but may be distributed in a modular fashion amongst a number of different computers or processors to implement various embodiments.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various embodiments may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments may be implemented as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for synchronizing communication for a casino game playable at a plurality of gaming devices, comprising:

receiving, by a server comprising at least one processor, an indication of a wager from at least one of the plurality of gaming devices;

obtaining, by the server, indications of communication latency from the server to at least a first gaming device and a second gaming device of the plurality of gaming devices;

and sending, by the server, game outcome determinations to at least the first and second gaming devices, the sending comprising:

sending a first game outcome determination to the first gaming device through wired communication channels; and sending a second game outcome determination to the second gaming device through at least one wireless communication channel, wherein the game outcome determinations are based at least in part on the received indication of the wager, and wherein sending the first and second game outcome determinations is based at least in part on the indications of communication latency from the server to the first and second gaming devices.

2. The method of claim 1, further comprising determining, by the server, a transmission time for at least the first and second gaming devices, the transmission times indicating when sending of a game outcome determination to a respective gaming device is to occur, and wherein each transmission time is determined based at least in part on the indication of communication latency for the respective gaming device.

3. The method of claim 2, wherein the transmission times are further determined based on a highest communication latency of indications of communication latency from the server to each of the plurality of gaming devices.

4. The method of claim 1, wherein the first gaming device and the second gaming device are each a type of gaming device selected from the group consisting of: a casino gaming machine, a personal computer and a mobile device, and wherein the type of gaming device of the first gaming device and the type of gaming device of the second gaming device are different.

5. The method of claim 4, wherein the first gaming device is a casino gaming machine and the second gaming device is a mobile device.

6. The method of claim 1, wherein the second game outcome determination is sent to the second gaming device through at least one wired communication channel.

7. The method of claim 1, further comprising determining the game outcome determinations by the server.

8. The method of claim 1, further comprising receiving, by the server, an indication of at least one game outcome determination from one of the plurality of gaming devices.

9. The method of claim 1, wherein the first game outcome determination is an indication of a win condition and the second game outcome determination is an indication of a non-win condition.

10. The method of claim 1, wherein the wager is a non-cash wager.

11. A server system for synchronizing a casino game playable at a plurality of gaming devices, the server system comprising:

at least one communication interface configured to communicate with the plurality of gaming devices;

at least one processor; and at least one processor-readable storage medium comprising processor-executable instructions that, when executed, cause the at least one processor to:

receive, via the at least one communication interface, an indication of a wager from at least one of the plurality of gaming devices;

obtain indications of communication latency from the server system to at least a first gaming device and a second gaming device of the plurality of gaming devices; and send, via the at least one communication interface, game outcome determinations to at least the first and second gaming devices, the sending comprising:

sending a first game outcome determination to the first gaming device through wired communication channels; and sending a second game outcome determination to the second gaming device through at least one wireless communication channel, wherein the game outcome determinations are based at least in part on the received indication of the wager, and wherein sending the first and second game outcome determinations is based at least in part on the indications of communication latency from the server to the first and second gaming devices.

12. The server system of claim 11, wherein the processor-executable instructions, when executed by the at least one processor, further cause the at least one processor to determine a transmission time for at least the first and second gaming devices, the transmission times indicating when sending of a game outcome determination to a respective gaming device is to occur, and wherein each transmission time is determined based at least in part on the indication of communication latency for the respective gaming device.

13. The server system of claim 12, wherein the transmission times are further determined based on a highest communication latency of indications of communication latency from the server to each of the plurality of gaming devices.

14. The server system of claim 11, wherein the second game outcome determination is sent to the second gaming device through at least one wired communication channel.

15. The server system of claim 11, wherein the processor-executable instructions, when executed by the at least one processor, further cause the at least one processor to determine the game outcome determinations.

16. The server system of claim 11, wherein the processor-executable instructions, when executed by the at least one processor, further cause the at least one processor to receive, via the at least one communication interface, an indication of at least one game outcome determination from one of the plurality of gaming devices.

17. The server system of claim 11, wherein the first game outcome determination is an indication of a win condition and the second game outcome determination is an indication of a non-win condition.

18. The server system of claim 11, wherein the wager is a non-cash wager.

* * * * *